Sept. 28, 1954 G. V. NOLDE 2,690,302

COUNTER

Filed April 3, 1951

| | 50 | 51 | 52 | 53 | 54 |
|---|---|---|---|---|---|
| 0 | | | | | |
| 1 | X | | | | |
| 2 | | X | | | |
| 3 | X | X | | | |
| 4 | | | X | | |
| 5 | X | | X | | |
| 6 | | X | X | | |
| 7 | X | X | X | | |
| 8 | | | | X | |
| 9 | X | | | X | |
| 10 | | | | | X |

INVENTOR
George V. Nolde
BY
Howard M. Dustin.

Patented Sept. 28, 1954 2,690,302

UNITED STATES PATENT OFFICE 2,690,302

COUNTER

George V. Nolde, Berkeley, Calif., assignor to Marchant Calculators, Inc., a corporation of California Application April 3, 1951, Serial No. 219,059

11 Claims. (Cl. 235—92)

This invention relates to electronic decade counting circuits and particularly concerns the use of a set of signal retention devices for cooperation with a set of operating devices to count input signals.

The use of a decade counting circuit to actuate an accumulator or memory is familiar to those versed in the electronic art. Electronic counters may be divided into two principal classes, namely: (1) vacuum tube circuits, and (2) gas tube circuits. Numerous prior art circuits of the latter class have employed a set of thyratrons for counting input pulses. In the majority of these circuits the thyratrons themselves have been used as signal retention devices, representing one numeral value while in a conducting state and a second numeral value while in a non-conducting state; therefore, one set of thyratrons has been required for each denominational order of any accumulated numeral value. From the dual standpoint of space and materials, such an arrangement is manifestly inefficient in a plural order system.

The present invention achieves substantial economies in both space and materials by providing a decade counting circuit in which a single set of thyratrons is adaptable to count ordinal groups of input signals in sequential cooperation with a plurality of accumulator, or memory orders, each such order comprising a group of small and inexpensive signal retention devices. The thyratrons, which are illustrative of other operating devices, are arranged in four counting stages and a transfer stage. A signal retention device, illustrated as a storage capacitor, cooperates with each stage to receive charges and to bias the succeeding stage of thyratrons to conduction in accordance with a predetermined coded binary count. The thyratrons themselves are extinguished after each unit count, but the storage capacitors collectively progress through a charge cycle of ten counts before they are all discharged to indicate a zero count.

When the counting is completed in one order the thyratrons are associated with the next higher ordinal group of capacitors by a commutator, and the capacitors in the lower order retain their count-indicating charges for subsequent use in read-out.

Since the thyratrons are extinguished after each unit count regardless of the numeral value represented by the collective status of the storage capacitors, two advantages arise, viz: (1) it is not necessary to "zeroize" the thyratrons before commutating them from one order of storage capacitors to the next, and (2) it is not necessary to precondition the thyratrons to the previously stored count of an order of memory capacitors before associating the thyratrons with that order.

It is therefore a primary object of the present invention to employ a set of signal retention devices in cooperation with a set of operating devices for counting input signals.

It is a further object of the present invention to employ a single set of operating devices in sequential cooperation with a plurality of memory orders for counting ordinal groups of input signals.

It is another object of this invention to store information, representing ordinally accumulated values, in a series of small, inexpensive devices.

It is a further object of this invention to restore the operating devices of a counting circuit to a zero condition after each successive unit count.

It is another object of the present invention to actively associate a single group of operating devices with any given memory order without requiring any preconditioning of the operating devices.

It is another object of the invention to provide a simple and improved decade counter.

It is another object of this invention to accelerate the deionization of the gas within a conducting thyratron by negatively pulsing a control grid within such thyratron during a normal extinguishing operation.

Other objects will appear in the following detailed description of the preferred form of the invention, reference being made to the accompanying drawing in which.

Figures 1, 2:
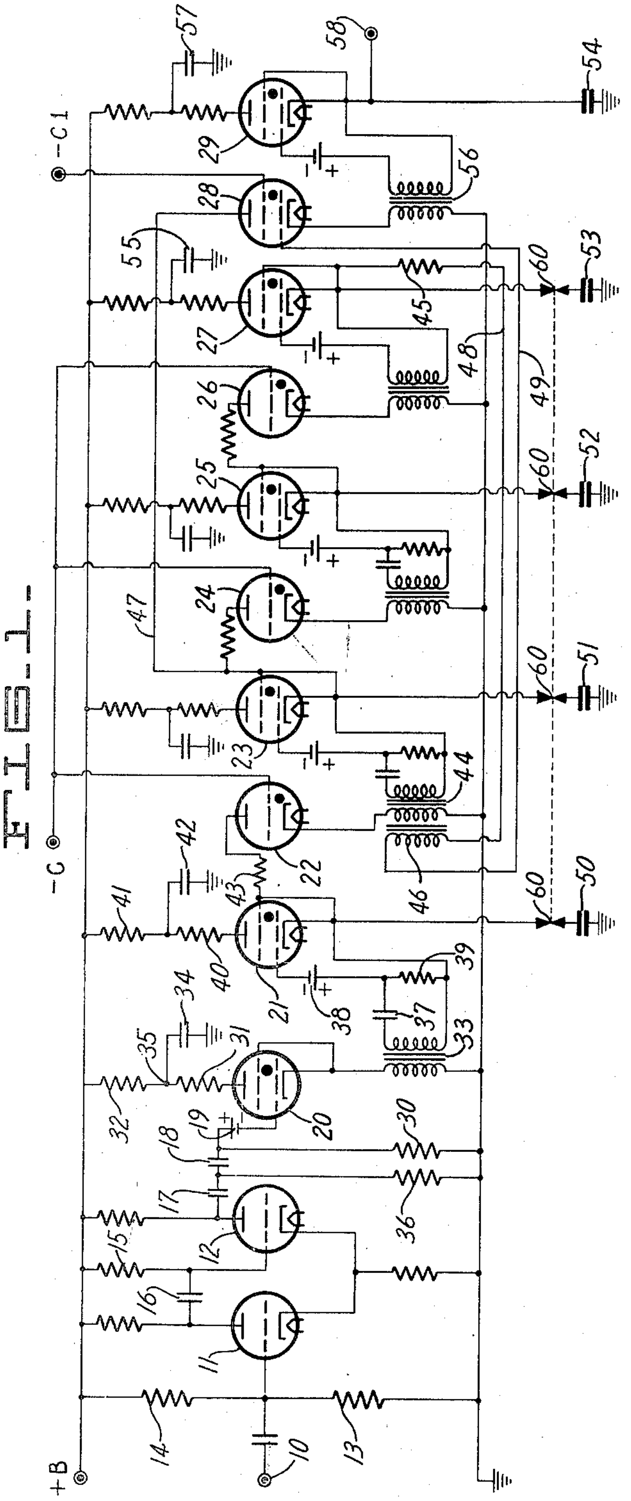
Fig. 1 is a wiring diagram of the preferred embodiment of the counting circuit.
Fig. 2 is a table of the charge-bearing condition of the four memory capacitors and the transfer capacitor of a given memory order at the completion of each integer of a count from one through ten in the given order.

The present counting circuit comprises an input pulse former section, four binary counting stages, and a single tens-carry, or transfer stage. The pulse former is provided for the purpose of receiving an input of unmeasured pulses, and in response thereto feeding an equal number of uniform, measured pulses to the counting stages.

Each counting stage except the first includes two thyratrons. The first thyratron of each stage except the first stage, is designated as a "breakdown" tube and is caused to conduct in response to the progression through two counts of the preceding stage. The first stage comprises a single thyratron which is designated as a "measuring" tube and is fired by each counting pulse which it receives from the pulse former section. The second thyratron of each stage following the first stage is also a measuring tube and is fired by each conduction of its companion breakdown tube. As each measuring tube fires, it stores a measured charge on an associated memory capacitor which is coupled to and biases the breakdown tube of the next succeeding stage. A second successive conduction of any measuring tube stores a second charge on its associated memory capacitor to bias the next succeeding breakdown tube to conduction. Four such stages of tubes so connected would normally progress through fifteen counts upon receipt of fifteen pulses and return the associated ordinal group of memory capacitors to zero condition upon receipt of a sixteenth pulse. In the present circuit, however, the normal binary counting limit of sixteen is modified, through a feed-back system, to a ten count cycle. The fifth stage of tubes in the present circuit is coupled to the counting stages and is actuated upon each tenth count to store a tens-carry or transfer charge and to initiate the aforesaid feedback operation for returning the associated ordinal group of memory capacitors to a zero condition. The stored transfer charge is subsequently employed to cause a transfer pulse to be fed to the input side of the same or a similar counting circuit when the latter is associated with the next sequential memory order through the agency of the previously mentioned commutator.

The present invention is therefore based on the storage of each ordinal count of an electronic counter by devices which cooperate with, but which are separable from, the counter, thereby enabling commutation of a single counter into sequential association with two or more memory orders.

The pulse former section of the counting circuit comprises a pair of vacuum triodes 11 and 12, Fig. 1, and a pulse amplifying thyratron 20. Tubes 11 and 12 are interconnected to form a conventional one-shot multivibrator, or "univibrator," and may comprise the two sections of a duotriode. Tube 11 is normally biased slightly below cutoff by tapping its control grid to a point between two resistors 13 and 14, which are connected in series between +B and ground, and tube 12 is normally biased to conduction by a resistor 15 connecting its control grid to +B. The anode of tube 11 is coupled by a capacitor 16 to the control grid of tube 12. The unmeasured pulses which are to be counted are fed to the univibrator at an input terminal 10, where they are capacitively coupled to the control grid of tube 11. Each input pulse is sufficiently positive to bias tube 11 to conduction, lowering the anode voltage of that tube to couple a negative pulse through capacitor 16 to the control grid of tube 12, biasing the latter tube below conduction. The negative pulse impressed on the grid of tube 12 is gradually drained to +B through resistor 15, allowing tube 12 to resume conduction. The time required to drain the negative pulse to +B is determined by the time constant of the circuit comprising capacitor 16 and resistor 15. By proper choice of the values of these two circuit elements, tube 12 may be made to cut off for any desired length of time following each input pulse. Each time tube 12 is cut off, its anode voltage rises toward +B level, forming a positive pulse which is fed to tube 20. It may be here noted that if it is desired to feed negative instead of positive pulses into input terminal 10, the univibrator may be arranged in reverse order, i. e., with tube 11 normally conducting and tube 12 normally cut off and biased through an RC circuit to ground. The desired positive pulse input to tube 20 may then be tapped from the anode of tube 11 in response to each input pulse to the univibrator.

The positive pulses formed by the univibrator are fed to the control grid of the pulse amplifier tube 20 through an impedance matching coupling comprising a series capacitor 17 and a resistor 36 by-passed to ground, a capacitor 18, hereinafter designated an "acceleration capacitor," and a grid-bias source 19. The function of capacitor 18 will be described in detail hereinafter. Tube 20, which is illustrated as a negative bias tube, is normally biased below conduction by source 19 and a grid resistor 30 in series between the control grid and ground. Tube 20 may be of the positive bias type, in which case source 19 is unnecessary. The anode of tube 20 is connected to +B by anode resistors 31 and 32 in series. An extinguishing capacitor 34 is connected to ground from a point 35 between resistors 31 and 32 and is normally charged to substantially +B potential since, normally, there is no anode current through these resistors. The cathode of tube 20 is connected to ground through the primary winding of a coupling transformer 33. Although tube 20 is shown as a tetrode with its screen grid being connected to the cathode, a triode or other tube may be substituted therefor; but out of the tubes available for experimentation, the tetrode gave the most reliable performance.

Each of the above mentioned positive pulses which are impressed on the control grid of tube 20, biases that tube to conduction, so that the charge on capacitor 34 drains to ground through resistor 31, the conducting discharge path of tube 20, and the primary winding of transformer 33. The discharge of capacitor 34 lowers the potential at point 35 sufficiently to extinguish tube 20. Capacitor 34 recharges from +B through resistor 32 which must be kept large enough to prevent this capacitor from recharging before the gas in tube 20 is deionized; otherwise, that tube will either continue to fire or will be repetitively fired and will oscillate. However, by using a large value for resistor 32 to prevent such oscillations, the response time of tube 20 is made undesirably large, that is, the tube is not extinguished fast enough to respond reliably to closely spaced input pulses.

In order to decrease the deionization time of the gas in tube 20, thereby permitting resistor 32 to be of smaller value, and consequently improving the tube's response to rapid pulsing, the control grid is given a sharp negative pulse to insure and accelerate the extinction of the tube. For this purpose, the previously mentioned accelerating capacitor 18 is connected in series with the control grid input of tube 20. As each positive pulse which is impressed on the control grid of tube 20 fires that tube, in the manner described above, the resulting control grid current neutalizes the positive charge on the righthand side of capacitor 18. Therefore, when the potential of the righthand side of capacitor 18 drops in response to the trailing edge of the positive input pulse, a sharp negative bias is impressed on the control grid of tube 20 and accelerates the deionization process within the tube. The charge on capacitor 18 subsequently drains through the circuit comprising resistor 36, ground and resistor 30.

Each conduction of pulse amplifier tube 20 fires the first stage measuring tube in the following manner. During the short conduction period of tube 20, caused by each input pulse thereto, the transient anode current through the primary winding of the transformer 33 causes a positive pulse to be coupled through that transformer and impressed on the control grid of tube 21, through an accelerating capacitor 37 and a grid bias source 38. Tube 21 is a gas-filled tetrode and is normally biased below conduction by source 38, which is connected between the control grid and the cathode in series with a resistor 39. Tube 21 receives anode potential through series connected anode resistors 40 and 41. A measuring capacitor 42 is shunted to ground from a point between resistors 40 and 41. Capacitor 42 is normally charged to substantially +B potential through resistor 41. The cathode of tube 21 is connected to one terminal of the first stage memory capacitor 50, the other terminal of which is connected to ground or other suitable reference potential.

It is to be noted that the transformer couplings shown, such as transformer 33 between tubes 20 and 21, may be replaced by other types of couplings without departing from the invention. For instance, a capacitive coupling may be substituted by connecting the cathode of tube 20, as shown in Fig. 1, to the left hand side of capacitor 37 and removing the secondary winding of transformer 33. Thus, the primary winding of this transformer forms the cathode impedance for tube 20, and resistor 39 forms the discharge path for capacitor 37.

When tube 21 conducts, as previously described, measuring capacitor 42 discharges into memory capacitor 50 through resistor 40 and the conducting discharge path of tube 21. When capacitor 42 is discharged sufficiently, the anode potential of tube 21 is lowered below ionization level and the tube is extinguished in the same manner as tube 20, described above. Therefore, a measured positive charge is delivered to the memory capacitor 50 during each conduction of tube 21.

Just as tube 20 must be quickly extinguished to improve the response of the counting circuit, so must tube 21. The above-mentioned accelerating capacitor 37 is alternately charged and discharged by each pulse from tube 20, the trailing edge of each such pulse impressing a sharp negative pulse on the control grid of tube 21. This is accomplished in the same manner as fully described in connection with tube 20, except that the secondary winding of transformer 33 replaces resistor 36 in the discharge path for the accelerating capacitor.

When tube 21 conducts a second time, due to a second input pulse from tube 20, the second stage breakdown tube 22 is biased to conduction in the following manner. The high potential terminal of capacitor 50 is connected by a current limiting resistor 43 to the anode of tube 22. This tube is normally biased well below conduction by connecting its control grid to a negative terminal −C of a source of unidirectional potential. A single positive charge stored on capacitor 50 is insufficient when impressed upon the anode of tube 22 to bias that tube to conduction. However, when tube 21 fires a second time, it charges capacitor 50 to a second, and higher, level of potential which is sufficient to fire tube 22, and capacitor 50 discharges through the anode circuit of the latter tube. When capacitor 50 is discharged sufficiently, the anode of tube 22 is lowered below ionization level and that tube is extinguished, leaving a charge on capacitor 50 corresponding to the de-ionization potential of tube 22. The potential of this charge on capacitor 50 will be considered the zero, or reference level, since, except for leakage, the capacitor potential never drops below this level.

Conduction of the second stage breakdown tube 22 causes conduction of the companion measuring tube 23 as follows. The primary winding of a coupling transformer 44 is in series with the cathode circuit of tube 22, so that the secondary winding of that transformer is pulsed sharply during each conduction of this tube. The aforesaid secondary winding is in the control grid input circuit of tube 23, so that tube 23 is fired by each such inductively coupled pulse. The cathode circuit of tube 23 includes the second stage memory capacitor 51. The arrangement and action of tube 23 are identical to that of tube 21 so that capacitor 51 is charged once in response to each two charges stored on capacitor 50. The third counting stage comprises breakdown tube 24, measuring tube 25 which is inductively coupled to tube 24, and the third memory capacitor 52. The fourth stage comprises breakdown tube 26, measuring tube 27 which is inductively coupled to tube 26, and the fourth memory capacitor 53. The third and fourth stages operate in the same manner as the second stage. It will therefore appear that each stage counts at one-half the rate of the preceding stage; otherwise stated, each stage pulses the succeeding stage once for each two counts stored.

It is noted in Fig. 1 that no accelerating capacitor is used in the fourth stage, i. e., in the grid input of tube 27. Since the fourth stage counts at only one-eighth the speed of the first stage, its response is sufficiently rapid without use of such accelerating means. It may be further noted that the inductive coupling which is shown between each breakdown tube and its associated measuring tube is merely for the purpose of illustration. These tubes may be coupled in any conventional manner without departing from the spirit of the invention.

Fig. 2 illustrates the charge-bearing condition of the four memory capacitors 50–53 and a transfer capacitor 54 at the end of each count, i. e., after the counting circuit has reached a stable condition following each input pulse. Each row of the chart in Fig. 2 bears a reference numeral 50–54 and represents the corresponding memory or transfer capacitor. Each column bears a number 0–10, representing the total number of input pulses prior to the indicated condition of the five ordinal capacitors. An "X" in any space indicates that the designated capacitor is charged to one unit step of charge following the receipt, by the counting circuit, of the designated total number of pulses. The absence of an "X" in any space indicates that the capacitor under consideration is discharged to the above-mentioned zero reference level after completion of the indicated count.

It will be noted, in Fig. 2, that after the tenth count, all four membory capacitors 50–53 are in the discharged condition indicating the digit "0." Since four stages of a binary memory, such as described above, would, if unmodified, count to 15 and return to zero on the 16th count, it is necessary to provide special means for zeroizing such a memory if it is to be cleared on any count other than the 16th. To clear the memory capacitors on the 10th count, as is required in the present decimal system counter, a feedback circuit has been provided as follows:

The fifth, or transfer, stage of the present circuit comprises a breakdown tube 28 and a measuring tube 29. The fourth stage memory capacitor 53 is coupled to the control grid of transfer breakdown tube 28 through a resistor 45, a lead 48, a tertiary winding 46 of the second stage transformer 44, and a lead 49. The second stage memory capacitor 51 is connected to the anode of tube 28 by a lead 47. Each time the second stage breakdown tube 22 is fired, i. e., in response to the even-numbered input pulses to the counter, the tertiary winding 46 of capacitor 44 impresses a positive pulse on the control grid of tube 28 over lead 49, but the magnitude of this pulse is normally insufficient to fire tube 28. However, the charge which is stored on memory capacitor 53 on the ninth count (in accordance with the normal binary progression, and as indicated in Fig. 2) is impressed as a constant bias on the control grid of tube 28, biasing that tube to slightly below conduction level. Therefore, when the counter receives the next even-numbered pulse (the tenth pulse), again firing tube 22, the pulse from the tertiary winding 46 of transformer 44, which is impressed on the control grid of tube 28 over lead 49, is sufficient to cause conduction to begin between the cathode and control grid of tube 28. Conduction of tube 22 also causes transformer 44 to couple a pulse to tube 23, firing the latter tube and storing a charge on capacitor 51. The potential of this positive charge is impressed, over lead 47, on the anode of tube 28. Since tube 28 is at this time conducting from cathode to control grid, the gas in the tube is ionized; therefore, the charge on capacitor 51 causes conduction between the cathode and anode of this tube, draining the single charge from capacitor 51. Tubes 22, 23 and 27 are then extinguished in the manner described hereinbefore. The charge on capacitor 53 drains to ground through resistor 45, lead 48, winding 46, lead 49 and the control grid circuit of tube 28, lowering the control grid potential of that tube to reference level. The discharge of capacitor 51 through the anode circuit of tube 28 lowers the anode potential of that tube below ionization level, and the tube is thereby extinguished, leaving a zero reference charge on capacitor 51. Therefore, the memory capacitors 50–53 are all at the zero reference level after the tenth count, and all of the thyratrons in the four counting stages are extinguished.

During the above-described conduction period of tube 28 on the tenth count, a transfer pulse is coupled to transfer measuring tube 29 through the cathode-side transformer 56 in the same manner as in the counting stages. This pulse fires tube 29 and stores a transfer charge on transfer capacitor 54 in the manner adequately described hereinbefore. Tube 29 is extinguished when its anode potential is lowered by the discharging of its associated measuring capacitor 57. Therefore, at the end of the tenth count, as indicated in Fig. 2, capacitor 54 is the only memory capacitor bearing a unit charge, capacitors 50–53 having been discharged to the reference level. The charge on capacitor 54 is impressed on output terminal 58. This charge is employed to cause a transfer pulse to be fed to the input side of the same or a similar counting circuit when the latter is associated, through the agency of the above-mentioned commutator, with the next higher memory order. The commutator is shown schematically by a respective pair of contacts 60 which are interposed between each memory capacitor 50–53 and its associated measuring tube.

It is to be noted that, although tubes 21, 23, 25, 27, 28 and 29 are shown as tetrodes, each with its second grid connected to its cathode, triodes of the proper characteristics may be used. However, of the tubes in large scale manufacture and available for experimentation, the 2D21 tetrode gave the most reliable operation. The 2D21 was also used, for convenience of experimentation, for tubes 22, 24 and 26 which are shown as triodes. In these latter tubes, the most reliable operation and the desired characteristics were obtained by using the first grid as the anode, the second grid as the control grid, and letting the element which is conventionally designated as the anode float free. Therefore, these tubes are shown as triodes in accordance with their present use.

I claim:

1. In a counting circuit, a series of stages of operating devices, each device normally being in a first condition of operation, means coupled to said devices for applying input voltage signals thereto, a series of signal retention devices coupled to said stages of operating devices for priming and operating the latter in binary progression in response to the input signals and for assuming a collective status representative of the total number of input pulses, and circuit means coupled to each operating device for returning the latter to said first condition in response to an operation thereof.

2. A counting circuit according to claim 1 including a modifying means intercoupling certain of said stages and responsive to the input into the counting circuit of a predetermined number of input signals fewer than the unmodified binary counting limit of said circuit for clearing said signal retention devices, and means responsive to said clearing means for generating an output signal.

3. In a cyclically operable electronic counter, a series of normally non-conducting gas-filled tubes each having at least an anode and a cathode, anode supply means for said tubes, pulse input means coupled to a first one of said tubes and effective upon the occurrence of each input pulse for firing said first tube, a series of memory capacitors coupled to said tubes for priming and firing the latter in binary progression in response to said input pulses to thereby charge said capacitors in binary progression, means responsive to the conduction of any tube for extinguishing said last named tube, and a modifying feedback circuit interconnecting certain of said tubes and memory capacitors to discharge any charged memory capacitor and to energize an output terminal upon the occurrence of a predetermined number of input pulses less than the unmodified cyclic binary counting limit of the circuit.

4. In a cyclically operable counting circuit, a series of operating devices each device having one condition of stability, signal input means coupled to the operating devices and effective upon the application of an input signal for triggering a first one of said devices to an unstable condition, a respective signal retention device associated with each operating device, said signal retention device being normally in a zero-representing status, means coupling each operating device to its associated signal retention device and effective in response to said unstable condition of the former for causing the latter to assume a value-representing status, means including said signal retention devices coupling the operating devices in cascade and responsive to two successive operations of any operating device except the last for triggering the next succeeding operating device to an unstable condition, means operable in response to the unstable condition of a respective operating device for returning to a zero-representing status the signal retention device associated with the next preceding operating device, means responsive to an unstable condition of an operating device for returning the latter to a stable condition, and a modifying feedback circuit intercoupling certain operating devices and signal retention devices for zeroizing any value-representing signal retention device in response to the receipt by the counting circuit of a predetermined number of input signals less than the unmodified cyclic counting limit of such circuit.

5. A counting circuit according to claim 4 including means coupled to the feedback circuit and responsive to said operation thereof for generating an output signal.

6. In an electronic counter having, four counting stages, each stage comprising a normally non-conducting thyratron having at least an anode and a cathode, and anode supply means connected to said thyratrons; the combination, a respective capacitor connecting the cathode of each of said thyratrons to ground for storing a unit charge in response to each conduction of the associated thyratron, a pulse input means coupled to a first one of said thyratrons and effective upon the occurrence of an input pulse for firing said first thyratron, a respective means coupled to each of said thyratrons and operable in response to conduction of said thyratron for extinguishing the latter, means coupling each capacitor except the last with the thyratron of the next succeeding stage, said coupling means being controlled by the storage of a second charge on said capacitor to cause said succeeding thyratron to fire for discharging said capacitor, a transfer stage including a thyratron having at least a cathode and an anode, a transfer storage capacitor connected between the cathode of said transfer stage thyratron and ground, feedback means coupling the transfer stage to one or more counting stages and responsive to the operation of the counting stages in response to a tenth count for discharging any charged counting stage capacitor and for firing the transfer thyratron to store a charge on the transfer storage capacitor, and means responsive to conduction of the transfer thyratron for extinguishing the same.

7. In an electronic counter, the combination of, four normally non-conducting gas-filled measuring tubes each having at least an anode and a cathode, a potential supply means connected by a respective impedance to the anode of each measuring tube, a respective memory capacitor in series between the cathode of each measuring tube and ground, pulse input means coupled to a first one of the measuring tubes for firing the latter upon the occurrence of each input pulse to store a predetermined unit charge on the associated memory capacitor, a respective gas-filled breakdown tube coupling each memory capacitor to the succeeding measuring tube and biased to conduction upon the storage of two charges by said memory capacitor to discharge the latter and to fire said succeeding measuring tube, means responsive to the discharging of a memory capacitor for extinguishing the succeeding breakdown tube, means coupled to each measuring tube and responsive to conduction of said measuring tube for extinguishing the same, a transfer stage including a breakdown tube and a measuring tube, a transfer storage capacitor connecting the cathode of the transfer measuring tube to ground, means coupling the fourth stage memory capacitor and the transfer breakdown tube for priming the latter in response to the eighth input pulse, means coupling the second stage breakdown tube and the fourth stage breakdown tube for firing the latter in response to the tenth input pulse to discharge said fourth stage memory capacitor, a coupling between the transfer breakdown tube and the second stage memory capacitor for discharging the latter upon conduction of the former, means responsive to the discharging of said second stage memory capacitor for extinguishing said transfer breakdown tube, a coupling between the transfer breakdown tube and the transfer measuring tube to fire the latter upon each conduction of the former for storing a charge on said transfer capacitor, and means responsive to a conduction of the transfer measuring tube for extinguishing the same.

8. In a device of the class described, the combination of, a first and second normally non-conducting gas-filled tube each having at least an anode and a cathode, anode supply means, a respective resistor connecting said supply means to the anode of the second tube, input means coupled to the first tube for firing the latter, means coupled to the first tube for extinguishing said first tube in response to conduction thereof, a coupling between the first and second tubes responsive to each conduction of the first tube for coupling a pulse to the second tube to fire the latter, a normally discharged memory capacitor connecting the cathode of the second tube to ground and progressively charged by each conduction of said seocnd tube, a normally charged capacitor connected between the anode of the second tube and ground and responsive to conduction of said second tube for extinguishing the latter, and circuit means coupled to said memory capacitor and responsive to a second charge on the memory capacitor to discharge the latter.

9. A device according to claim 8, including a control grid in said second tube, an accelerating capacitor in series with said control grid for developing a strong negative grid bias in response to the trailing edge of each input pulse of said second tube, thereby accelerating deionization of the gas within said second tube, and a high impedance discharge path for said accelerating capacitor.

10. A device of the class described having, means for generating ordinal groups of input pulses, and a series of operating devices coupled to the pulse input means, the combination of, two or more ordinal series of signal retention devices effective when coupled to said series of operating devices to prime and operate the latter in binary progression in response to said input pulses for storing on said signal retention devices a binary representation of the total number of input pulses in the respective ordinal group, and commutation means for sequentially coupling the series of operating devices into operative relationship with each series of count storage devices in predetermined succession.

11. A device of the class described having, means for generating ordinal groups of input pulses, and a series of operating devices coupled to the pulse input means, the combination of, two or more ordinal series of count storage devices, each of said series of storage devices being effective when coupled to said series of operating devices to coact with the latter in response to said input pulses for storing charges representing the total number of input pulses in the respective ordinal group, commutation means for sequentially coupling the series of operating devices into operative relationship with each series of count storage devices in predetermined succession, and a transfer circuit coupled to certain of said operating devices and effective upon the occurrence of a tenth input pulse in a given count storage order to discharge the group of count storage devices in said order and to store a charge on the transfer storage device.

References Cited in the file of this patent

UNITED STATES PATENTS

| Number | Name | Date |
|---|---|---|
| 2,342,753 | Pearson et al. | Feb. 29, 1944 |
| 2,402,372 | Compton et al. | June 18, 1946 |
| 2,426,278 | Mumma | Aug. 26, 1947 |
| 2,428,149 | Falk | Sept. 30, 1947 |
| 2,438,962 | Burlingame et al. | Apr. 6, 1948 |
| 2,483,620 | Burlingame et al. | Oct. 4, 1949 |
| 2,514,054 | Hallden | July 4, 1950 |
| 2,543,779 | Crenshaw, Jr. | Apr. 24, 1951 |